United States Patent Office 3,076,023
Patented Jan. 29, 1963

3,076,023
PROCESS FOR PREPARING D-HOMO STEROIDS
Emanuel Kaspar, Berlin-Wilmersdorf, and Martin Schenck, Berlin-Frohnau, Germany, assignors to Schering AG., Berlin, Germany
No Drawing. Filed May 24, 1961, Ser. No. 112,199
Claims priority, application Germany May 31, 1960
12 Claims. (Cl. 260—488)

The present invention relates to the production of D-homo steroids and more particularly to superior methods for the production of such D-homo steroids and to the production of new D-homo steroids.

Certain D-homo steroids have been produced prior to the present invention, however the methods of production involve rather circuitous and devious routes.

Von Heusser in Helv. Chim. Acta, volume 33, page 1093 carried out the conversion of $\Delta^5$-androstene-3$\beta$-ol-17-one into D-homo-$\Delta^5$-androstene-3$\beta$-ol-17-one in accordance with the following reaction scheme:

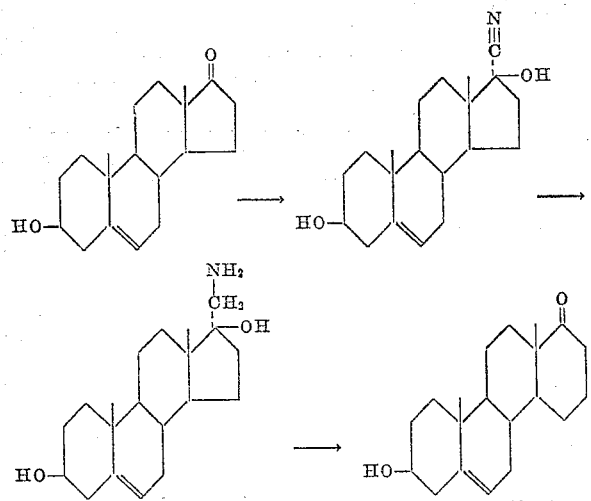

The last compound above is the D-homolog. Dodson in the Journal of the American Chemical Society, volume 75, page 5132 describes the conversion of the last named compound into the two stereo isomers of D-homo-17a-ethinyl-$\Delta^5$-androstene-3$\beta$-17a-diol, and the further conversion thereof into D-homo-$\Delta^{5,17(17a)}$-pregnadiene-3$\beta$-ol-20-one, in accordance with the following reaction mechanism:

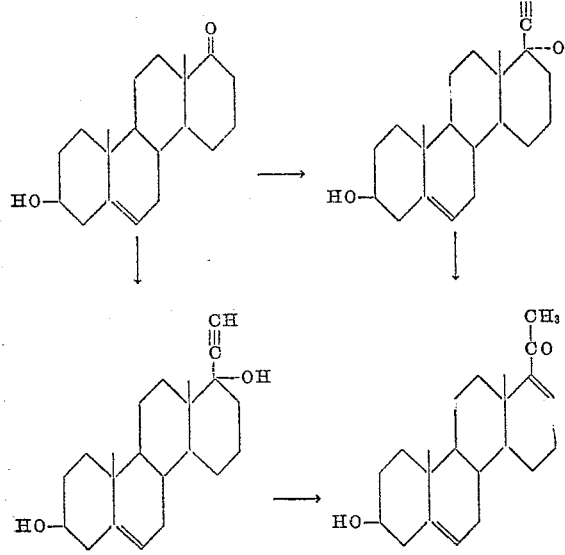

Since it is to be expected that the D-homologs of known progrestative or corticoid-active steroids of the prenane series would have valuable properties of the same type as the corresponding regular steroid, with respect to the pharmacological activity, rational methods for the production of such D-homologs have been sought and would be a considerable technical advance in the art.

It is accordingly a primary object of the present invention to provide a simple, direct and elegant method for the production of D-homologs of $\Delta^{17(17a)}$-20-ketosteroids.

It is another object of the present invention to provide for the production of new D-homo-20-ketosteroids.

It is yet another object of the present invention to provide new D-homo-20-ketosteroids of the pregnane series which have marked progestational and corticoid-activity.

Other objects and advantages of the present invention will be apparent from a further reading of the specification and of the appended claims.

With the above and other objects in view the present invention mainly comprises the method of producing $\Delta^{17,(17a)}$-unsaturated D-homologs of 20-ketopregnanes, which comprises enolizing the 20-keto group of a 16,17$\alpha$-methylene-20-keto steroid so as to form the corresponding enol-ester, and saponifying the thus formed enol-ester, thereby forming the corresponding $\Delta^{17,(17a)}$-D-homolog of said 20-keto steroid.

Instead of using a 16,17$\alpha$-methylene-20-keto-steroid as the starting compound for the production of the $\Delta^{17,(17a)}$-D-homolog in accordance with the present invention it is also possible to start with the precursor of the 16,17$\alpha$-methylene-20-ketosteroid, namely the 16,17-diazomethylene-20-ketosteroid which may be also designated as the corresponding $\Delta^1$-pyrazoline compound.

The enolization of the 20-ketosteroid group may be carried out according to known conditions for enolization of the 20-keto group, namely by the action of a carboxylic acid anhydride such as acetic acid anhydride in the presence of a strong acid catalyst such as p-toluene sulfonic acid or perchloric acid. The formed enol ester can then be saponified in known manner to result in the production of the $\Delta^{17,(17a)}$-D-homo-20-ketosteroid.

This reaction proceeds in effect in accordance with the following reaction mechanism:

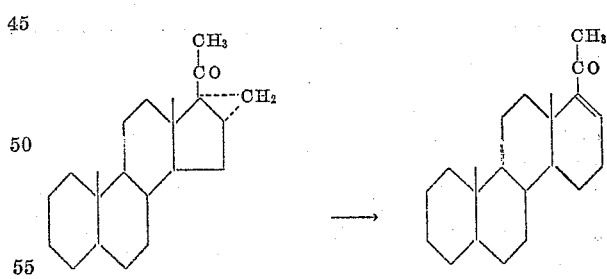

As indicated above it is possible to use as starting compounds for the method of the present invention instead of 16,17$\alpha$-methylene-20-ketosteroids the precursor thereof, namely the corresponding $\Delta^1$-pyrazoline compound from which the 16,17$\alpha$-methylene-20-ketosteroids are produced by the action of known acid catalysts such as perchloric acid with the giving off nitrogen to form 16,17$\alpha$-methylene-20-ketosteroids. Starting from the 16,17-diazomethylene-20-ketosteroid (or $\Delta^1$-pyrazoline compound) instead of the corresponding 16,17$\alpha$-methylene-20-ketosteroid in the presence of for example perchloric acid which in accordance with the present invention is used for enolization, followed by the saponification in accordance with the present invention there is obtained from the starting $\Delta^1$-pyrazolino compound directly the corresponding D-homo compound. This reaction proceeds in accordance with the following reaction mechanism:

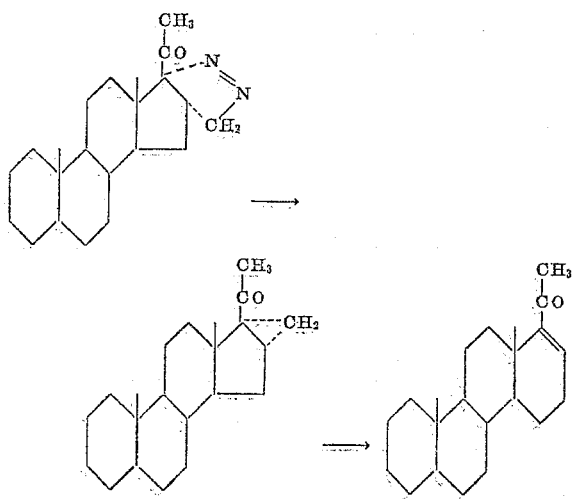

From the above simplified setting forth of the conversion in accordance with the present invention it is apparent that it is only necessary to consider the actual groups which are acted upon. The presence of other groups such as double bonds, keto groups, hydroxyl groups (in free or functionally altered form), halogens, particularly to the extent that the same are needed for or at least do not hurt the particular pharmacological effect, do not interfere with the method of the present invention.

The 20-ketosteroids which are preferred as starting compounds for the method of the present invention are compounds of the following formula:

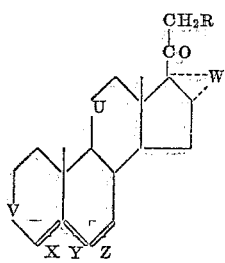

wherein R is selected from the group consisting of H, OH and Oacyl wherein acyl is derived from a lower aliphatic carboxylic acid, wherein U is selected from the group consisting of —CH$_2$—, —CHOH—, —CO—, and —CHOacyl wherein acyl is derived from a lower aliphatic carboxylic acid, wherein V is selected from the group consisting of —CH$_2$—, —CHOH—, —CO—, and —CHOacyl wherein acyl is derived from a lower aliphatic carboxylic acid, wherein W is selected from the group consisting of

and

and wherein X, Y and Z are each selected from the group consisting of single bonds and double bonds with Y being a double bond only when X and Z each are a single bond.

The useful and novel compounds which are produced in accordance with the method of the present invention are D-homologs of the following formula:

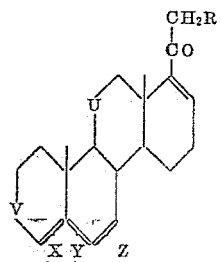

wherein U is selected from the group consisting of —CH$_2$—, —CHOH—, —CO—, and —CHOacyl— wherein acyl is derived from a lower aliphatic carboxylic acid, wherein V is selected from the group consisting of —CH$_2$—, —CHOH—, —CO—, and —CHOacyl— wherein acyl is derived from a lower aliphatic carboxylic acid, wherein X, Y and Z are each selected from the group consisting of single bonds and double bonds with Y being a double bond only when Z is a single bond, and wherein when Y is a single bond R is selected from the group consisting of H, OH and Oacyl, and when Y is a double bond R is selected from the group consisting of OH and Oacyl, acyl being derived from a lower aliphatic carboxylic acid.

As indicated above these new compounds have important progestational and corticoid activity. In addition, the compounds are useful as intermediates for the production of valuable steroids, for example by the esterification of any present hydroxyl group, by the hydrogenation of the 17,17α-double bond, by the hydrogenation of any other double bond, and by other known proceedings.

The 16,17-diazomethylene-20-ketosteroids and the 17α-methylene-20-ketosteroids which are used as starting compounds in accordance with the method of the present invention may themselves be formed, for example as described in U.S. patent application Serial No. 60,812, filed on October 6, 1960 by Rudolf Wiechert et al., for Production of 1,2-Methylene and 16,17-Methylene-Ketosteroids."

The following examples are given to further illustrate the present invention. The scope of the invention is not, however, meant to be limited to the specific details of the examples.

*Example 1*

10 g. of 16,17α-methylene-Δ$^5$-pregneneolone-3-acetate are heated to boiling with 1 liter of acetic acid anhydride and 5 g. of p-toluene sulfonic acid-monohydrate for 5 hours while slowly distilling. The greatest part of the solvent is then distilled off in vacuum under nitrogen, 300 cc. of methanol and 4 cc. of concentrated hydrochloric acid are added and the reaction mixture is then heated for 1 and ½ hours under nitrogen with refluxing. 40 cc. of pyridine are added and the reaction mixture is then subjected to steam distillation. The resulting precipitated product is filtered off under suction and recrystallized from ethyl acetate over carbon. There is thus obtained 4.2 g. of D-homo-Δ$^{5,17(17a)}$pregnadiene-3β-ol-20-one having a melting point of 222-226° C.

Further recrystallization results in the melting point being 230-232.5° C.

$[\alpha]_D^{24}$ +36° (c. =0.5; CHCl$_3$); U.V. $\epsilon_{233}$ =8920.

2.0 g. of D-homo-Δ$^{5,17(17a)}$-pregnadiene-3β-ol-20-one are allowed to stand for 16 hours at room temperature in a mixture of 8 cc. of pyridine and 4 cc. of acetic acid anhydride. The reaction mixture is then stirred into ice water, the precipitated product is filtered off under suction, dried and crystallized from methanol. The thus obtained D-homo-Δ$^{5,17(17a)}$-pregnadiene-3β-ol-20-one-acetate has a melting point of 170-173° C. The yield is 1.9 g. Further recrystallization results in the melting point of 174.5–175.5° C.

$[\alpha]_D^{24} +22°$ (c. =1; $CHCl_3$) U.V.: $\epsilon_{232}$ =8980.

Example 2

1.0 g. of 16,17α-methylene-progesterone in 100 cc. of acetic acid anhydride with 500 mg. of p-toluene-sulfonic acid-monohydrate are heated and worked up analogously to Example 1. The thus obtained residue is heated under refluxing under nitrogen for 10 minutes with 30 cc. of methanol and 0.4 cc. of concentrated hydrochloric acid and then further worked up analogously to Example 1. The crude product which is obtained after steam distillation is subjected to chromatography over 100 g. of silica gel (containing 10% of water) with methylenechloride. There is thus obtained D-homo-$\Delta^{4,17(17a)}$-pregnadiene-3, 20-dione having a melting point of 169–171° C. The following example describes another method of obtaining the same product:

Example 3

328 mg. of D-homo-$\Delta^{5,17,(17a)}$-pregnadiene-3β-ol - 20-one in 12 cc. of absolute toluene, 3.2 cc. of cyclohexanone and with 317 mg. of aluminum isopropylate oxidized and worked up in normal manner. The thus obtained crude product is crystallized from methanol and there is thus obtained D-homo-$\Delta^{4,17(17a)}$-pregnadiene-3,20-dione having a melting point of 170.5–172° C.

Further recrystallization results in the melting point being 172–173° C.

U.V.: $\epsilon$=24,200.

Example 4

500 mg. of 16,17-methylene-$\Delta^5$-pregnene-3β-ol-20-one-3-acetate are reacted in 31 cc. of acetanhydride with 0.08 cc. of 70% perchloric acid and the reaction mixture is allowed to stand for 1 and ½ hours at room temperature. The reaction mixture is then stirred into ice water containing pyridine, shaken with methylenechloride, washed with 3 normal hydrochloric acid and water, then dried over sodium sulfate and concentrated. The thus obtained residue is then treated analogously to Example 1 with 0.2 cc. of concentrated hydrochloric acid in 15 cc. of methanol and further worked up. After chromatography over silica gel which contains 10% of water and elution with methylenechloride-chloroform (1:1) the D-homo-$\Delta^{5,17(17a)}$-pregnadiene-3β-ol - 20 - one having a melting point of 228–230° C. is isolated.

Example 5

200 mg. of 16,17α-methylene-5α-pregnane-3β-ol-20-one-acetate in 20 cc. of acetanhydride with 100 mg. of p-toluene sulfonic acid-monohydrate are heated for 5 hours and further worked up analogously to Example 1. The thus obtained D-homo-$\Delta^{17(17a)}$-5α-pregnene-3β-ol-20-one melts after crystallization from methanol at 172–173° C.

Example 6

500 mg. of [$\Delta^{1'}$-pyrazolino]-4',5':16,17[$\Delta^5$-pregnene-3β-ol-20-one-acetate] are added in portions to a solution of 31 cc. of acetanhydride and 0.08 cc. of 70% perchloric acid and allowed to stand for 1 and ½ hours at room temperature. Thereafter the reaction mixture is stirred into pyridine containing ice water, shaken with methylenechloride, washed with 2 normal hydrochloric acid and with water, and after drying over sodium sulfate, evaporated.

There is than added 15 cc. of methanol and 0.2 cc. of concentrated hydrochloric acid thereto, the reaction mixture is heated for 1 and ½ hours under nitrogen and refluxing and the reaction mixture is poured into ice water, shaken with methylenechloride and further worked up as described above. After chromatography as in Example 4 there is obtained D-homo-$\Delta^{5,17(17a)}$-pregnadiene-3β-ol-20-one having a melting point of 228–230° C.

Example 7

200 mg. of 21-acetoxy-16,17-methylene-$\Delta^5$-pregnene-3β-ol-20-one produced from 16,17α-methylene-$\Delta^5$-pregnene-3β-ol-20-one by alkaline condensation with oxalic acid-diethylester and correspondingly further worked up through the 21-iodine compound in accordance with the usual methods, the compound having a melting point of 174–176° C.; $[\alpha]_D+37.5°$ ($CHCl_3$), is treated with acetanhydride and p-toluene sulfonic acid-monohydrate and further worked up analogously to Example 1. The thus obtained crude product is subjected to chromatography with methylenechloride over silica gel containing 10% water and there is thus obtained D-homo-$\Delta^{5,17(17a)}$-pregnadiene-3,21-diol-20-one.

U.V.: $\epsilon_{232}$=8500.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of producing $\Delta^{17,(17a)}$-unsaturated D-homologs of 20-ketopregnanes, which comprises enolizing the 20-keto group of a 16,17α-methylene-20-ketosteroid to the corresponding enol-ester; and saponifying the thus formed enol-ester, thereby forming the corresponding $\Delta^{17,(17a)}$-D-homolog of said 20-ketosteroid.

2. The method of producing $\Delta^{17,(17a)}$-unsaturated D-homologs of 20-ketopregnanes, which comprises enolizing the 20-keto group of a 16,17-diazomethylene-20-ketosteriod to the corresponding enol-ester; and saponifying the thus formed enol-ester, thereby forming the corresponding $\Delta^{17,(17a)}$-D-homolog of said 20-ketosteroid.

3. The method of producing $\Delta^{17,(17a)}$-unsaturated D-homologs of 20-ketopregnanes, which comprises reacting a 16,17α-methylene-20-ketosteroid with a carboxylic acid anhydride in the presence of a strong acid catalyst so as to enolize the 20-keto group and form the corresponding enol-ester; and saponifying the thus formed enol-ester, thereby forming the corresponding $\Delta^{17,(17a)}$-D-homolog of said 20-ketosteroid.

4. The method of producing $\Delta^{17,(17a)}$-unsaturated D-homologs of 20-ketopregnanes, which comprises reacting a 16,17-diazomethylene-20-ketosteroid with a carboxylic acid anhydride in the presence of a strong acid catalyst so as to enolize the 20-keto group and form the corresponding enol-ester; and saponifying the thus formed enol-ester, thereby forming the corresponding $\Delta^{17,(17a)}$-D-homolog of said 20-ketosteroid.

5. The method of producing $\Delta^{(17,17a)}$-unsaturated D-homologs of 20-ketopregnanes, which comprises reacting a 16,17α-methylene-20-ketosteroid with a carboxylic acid anhydride in the presence of a strong acid catalyst selected from the group consisting of p-toluene sulfonic acid and perchloric acid so as to enolize the 20-keto group and form the corresponding enol-ester; and saponifying the thus formed enol-ester, thereby forming the corresponding $\Delta^{17,(17a)}$-D-homolog of said 20-ketosteroid.

6. The method of producing $\Delta^{17,(17a)}$-unsaturated D-homologs of 20-ketopregnanes, which comprises reacting a 16,17-diazomethylene-20-ketosteroid with a carboxylic acid anhydride in the presence of a strong acid catalyst selected from the group consisting of p-toluene sulfonic acid and perchloric acid so as to enolize the 20-keto group and form the corresponding enol-ester; and saponifying the thus formed enol-ester, thereby forming the corresponding $\Delta^{17,(17a)}$-D-homolog of said 20-ketosteroid.

7. The method of producing $\Delta^{17,(17a)}$-unsaturated D-homologs of 20-ketopregnanes, which comprises reacting a 16,17α-methylene-20-ketosteroid with acetic acid anhydride in the presence of a strong acid catalyst selected from the group consisting of p-toluene sulfonic acid and perchloric acid so as to enolize the 20-keto group and form the corresponding enol-ester; and saponifying the thus formed enol-ester, thereby forming the corresponding $\Delta^{17,(17a)}$-D-homolog of said 20-ketosteroid.

8. The method of producing $\Delta^{17,(17a)}$-unsaturated D-homologs of 20-ketopregnanes, which comprises reacting a 16-17-diazomethylene-20-ketosteroid with acetic acid anhydride in the presence of a strong acid catalyst selected from the group consisting of p-toluene sulfonic acid and perchloric acid so as to enolize the 20-keto group and form the corresponding enol-ester; and saponifying the thus formed enol-ester, thereby forming the corresponding $\Delta^{17,(17a)}$-D-homolog of said 20-ketosteroid.

9. The method which comprises subjecting a 20-ketosteroid of the formula:

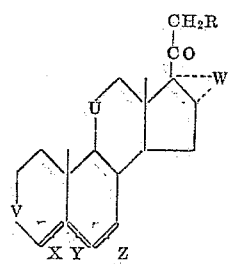

wherein R is selected from the group consisting of H, OH and Oacyl wherein acyl is derived from a lower aliphatic carboxylic acid, wherein U is selected from the group consisting of —CH$_2$—, —CHOH—, —CO—, and —CHOacyl wherein acyl is derived from a lower aliphatic carboxylic acid, wherein V is selected from the group consisting of —CH$_2$—, —CHOH—, —CO—, and —CHOacyl wherein acyl is derived from a lower aliphatic carboxylic acid, wherein W is selected from the group consisting of

and

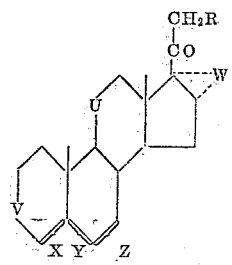

and wherein X, Y and Z are each selected from the group consisting of single bonds and double bonds with Y being a double bond only when X and Z each are a single bond to enolization of the 20-keto group, thereby forming the corresponding enol-ester; and saponifying the thus formed enol-ester, thereby forming the corresponding $\Delta^{17,(17a)}$-D-homolog of said 20-ketosteroid.

10. The method which comprises subjecting a 20-ketosteroid of the formula:

wherein R is selected from the group consisting of H, OH and Oacyl wherein acyl is derived from a lower aliphatic carboxylic acid, wherein U is selected from the group consisting of —CH$_2$—, —CHOH—, —CO,— and —CHOacyl wherein acyl is derived from a lower aliphatic carboxylic acid, wherein V is selected from the group consisting of —CH$_2$—, —CHOH—, —CO—, and —CHOacyl wherein acyl is derived from a lower aliphatic carboxylic acid, wherein W is selected from the group consisting of

and

and wherein X, Y and Z are each selected from the group consisting of single bonds and double bonds with Y being a double bond only when X and Z each are a single bond to the action of a carboxylic acid anhydride in the presence of a strong acid catalyst so as to enolize the 20-keto group and form the corresponding enol-ester; and saponifying the thus formed enol-ester, thereby forming the corresponding $\Delta^{17,(17a)}$-D-homolog of said 20-ketosteroid.

11. The method which comprises subjecting a 20-ketosteroid of the formula:

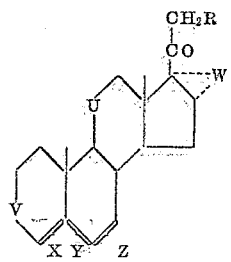

wherein R is selected from the group consisting of H, OH and Oacyl wherein acyl is derived from a lower aliphatic carboxylic acid, wherein U is selected from the group consisting of —CH$_2$—, —CHOH—, —CO—, and —CHOacyl wherein acyl is derived from a lower aliphatic carboxylic acid, wherein V is selected from the group consisting of —CH$_2$—, —CHOH—, —CO—, and —CHOacyl wherein acyl is derived from a lower aliphatic carboxylic acid, wherein W is selected from the group consisting of

and

and wherein X, Y and Z are each selected from the group consisting of single bonds and double bonds with Y being a double bond only when X and Z each are a single bond to the action of a carboxylic acid anhydride in the presence of a strong acid catalyst selected from the group consisting of p-toluene sulfonic acid and perchloric acid so as to enolize the 20-keto group and form the corresponding enol-ester; and saponifying the thus formed enol-ester, thereby forming the corresponding $\Delta^{17,(17a)}$-D-homolog of said 20-ketosteroid.

12. The method which comprises subjecting a 20-ketosteroid of the formula:

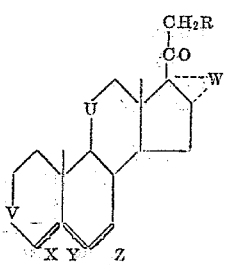

wherein R is selected from the group consisting of H, OH and Oacyl wherein acyl is derived from a lower aliphatic carboxylic acid, wherein U is selected from the group consisting of —CH$_2$—, —CHOH—, —CO—, and —CHOacyl wherein acyl is derived from a lower aliphatic carboxylic acid, wherein V is selected from the group consisting of —CH$_2$—, —CHOH—, —CO—, and —CHOacyl wherein acyl is derived from a lower aliphatic carboxylic acid, wherein W is selected from the group consisting of

and

and wherein X, Y and Z are each selected from the group consisting of single bonds and double bonds with Y being a double bond only when X and Z each are a single bond to the action of acetic acid anhydride in the presence of a strong acid catalyst selected from the group consisting of p-toluene sulfonic acid and perchloric acid so as to enolize the 20-keto group and form the corresponding enol-ester; and saponifying the thus formed enol-ester, thereby forming the corresponding $\Delta^{17,(17a)}$-D-homolog of said 20-ketosteroid.

References Cited in the file of this patent

UNITED STATES PATENTS

| | | |
|---|---|---|
| 2,351,637 | Ruzicka et al. | June 20, 1944 |
| 2,697,109 | Dodson | Dec. 14, 1954 |
| 2,784,234 | Dodson | Mar. 5, 1957 |
| 2,822,381 | Dodson | Feb. 4, 1958 |
| 2,860,158 | Clinton | Nov. 11, 1958 |